United States Patent
Mazumder et al.

(10) Patent No.: US 6,925,346 B1
(45) Date of Patent: Aug. 2, 2005

(54) CLOSED-LOOP, RAPID MANUFACTURING OF THREE-DIMENSIONAL COMPONENTS USING DIRECT METAL DEPOSITION

(76) Inventors: Jyoti Mazumder, 5074 Birkdale, Ann Arbor, MI (US) 48103; Joseph K. Kelly, 44696 Helm St., Plymouth, MI (US) 48170

( * ) Notice: Subject to any disclaimer, the term of this patent is extended or adjusted under 35 U.S.C. 154(b) by 797 days.

(21) Appl. No.: 09/671,538

(22) Filed: Sep. 27, 2000

Related U.S. Application Data

(63) Continuation-in-part of application No. 09/608,874, filed on Jun. 30, 2000, now abandoned, and a continuation-in-part of application No. 09/570,986, filed on May 15, 2000, now Pat. No. 6,410,105, and a continuation-in-part of application No. 09/526,631, filed on Mar. 16, 2000, which is a continuation-in-part of application No. 09/107,912, filed on Jun. 30, 1998, now Pat. No. 6,122,564.

(60) Provisional application No. 60/208,599, filed on Jun. 1, 2000, provisional application No. 60/204,303, filed on May 15, 2000, and provisional application No. 60/156,250, filed on Sep. 27, 1999.

(51) Int. Cl.[7] .............................................. G06F 19/00
(52) U.S. Cl. ....................................... 700/119; 700/121
(58) Field of Search .................................. 700/119, 120, 700/160, 182, 258, 121; 419/7; 219/121.15, 121.16, 121.23, 121.22, 121.3, 121.309, 121.42, 121.5, 121.6, 121.61, 121.62, 121.63, 121.79, 121.81, 121.83

(56) References Cited

U.S. PATENT DOCUMENTS

| | | | | |
|---|---|---|---|---|
| 4,323,756 A | | 4/1982 | Brown et al. | 219/121.66 |
| 4,724,299 A | | 2/1988 | Hammeke | 219/121.6 |
| 5,247,155 A | * | 9/1993 | Steen et al. | 219/121.83 |
| 5,659,479 A | * | 8/1997 | Duley et al. | 700/166 |
| 5,837,960 A | | 11/1998 | Lewis et al. | 219/121.63 |
| 5,966,312 A | * | 10/1999 | Chen | 703/6 |
| 5,985,056 A | * | 11/1999 | McCay et al. | 148/511 |
| 6,013,915 A | * | 1/2000 | Watkins | 250/341.1 |
| 6,046,426 A | * | 4/2000 | Jeantette et al. | 219/121.63 |
| 6,122,564 A | | 9/2000 | Koch et al. | 700/123 |
| 6,268,584 B1 | * | 7/2001 | Keicher et al. | 219/121.64 |
| 6,314,214 B1 | * | 11/2001 | Walter et al. | 385/13 |
| 6,323,951 B1 | * | 11/2001 | Borden et al. | 356/502 |
| 6,363,294 B1 | * | 3/2002 | Coronel et al. | 700/121 |

FOREIGN PATENT DOCUMENTS

CH    1340583 B1  *  2/2002

\* cited by examiner

*Primary Examiner*—Leo Picard
*Assistant Examiner*—Chad Rapp
(74) *Attorney, Agent, or Firm*—Gifford, Krass, Groh, Sprinkle, Anderson & Citkowski, PC

(57) ABSTRACT

Multiple criteria are monitored and controlled to enhance the success of direct-metal deposition, including greater control over factors such as deposit layer height/thickness, subharmonic vibration, contour path shape, powder mass flow, and deposition speed, and stress accumulation. Sensors are used to monitor some or all of the following parameters during the deposition process: deposit height, width, temperature, and residual stress. A predetermined limit with respect to the yield strength of the material is preferably set. If the stress exceeds that limit sensors will automatically introduce one or more remedial measures, the priority of which is established using a look-up table generated in accordance with prior experimental knowledge. To control temperature induced distortion and stress, an infrared temperature detector may be used in conjunction with a controller to reduce temperature, increase speed and decreased power for purpose of stress management.

20 Claims, 8 Drawing Sheets

CLOSED-LOOP, RAPID MANUFACTURING OF THREE-DIMENSIONAL COMPONENTS USING DIRECT METAL DEPOSITION

REFERENCE TO RELATED APPLICATIONS

This application claims priority of U.S. provisional patent application Ser. Nos. 60/156,250, filed Sep. 27, 1999; 60/204,303, filed May 15, 2000; 60/208,599, filed Jun. 1, 2000 and is a continuation-in-part of U.S. patent application Ser. Nos. 09/526,631, filed Mar. 16, 2000; Ser. No. 09/570,986, filed May 15, 2000, now U.S. Pat. No. 6,410,105; and Ser. No. 09/608,874, filed Jun. 30, 2000 now abandoned, which is a continuation-in-part of U.S. patent application Ser. No. 09/107,912, filed Jun. 30, 1998, now U.S. Pat. No. 6,122,564, the entire contents of each application being incorporated herein by reference.

FIELD OF THE INVENTION

This invention relates generally to the layered fabrication of three-dimensional components and, in particular, to a closed-loop system and method wherein a plurality of parameters may be monitored to optimize a direct metal deposition process.

BACKGROUND OF THE INVENTION

Fabrication of three-dimensional metallic components via layer-by-layer laser cladding was first reported in 1978 by Breinan and Kear. In 1982, U.S. Pat. No. 4,323,756 issued to Brown et al., describes a method for the production of bulk rapidly solidified metallic articles of near-net shape, finding particular utility in the fabrication of certain gas turbine engine components including discs and knife-edge air seals. According to the disclosure, multiple thin layers of feedstock are deposited using an energy beam to fuse each layer onto a substrate. The energy source employed may be a laser or an electron beam. The feedstock employed in the practice of the invention may be either a wire or powder material, and this feedstock is applied to the substrate in such a fashion that it passes through the laser beam and fuses to the melted portion of the substrate.

Different technologies have since evolved to improve such processes. U.S. Pat. No. 4,724,299 is directed to a laser spray nozzle assembly including a nozzle body with a housing that forms an annular passage. The housing has an opening coaxial with a passageway, permitting a laser beam to pass therethrough. A cladding powder supply system is operably associated with the passage for supplying cladding powder thereto so that the powder exits the opening coaxial with the beam.

Various groups are now working world-wide on different types of layered manufacturing techniques for fabrication of near-net-shape metallic components. In particular, nozzles of the type described above have been integrated with multi-axis, commercially available CNC machines for the fabrication of 3-dimensional components. U.S. Pat. No. 5,837,960 resides in a method and apparatus for forming articles from materials in particulate form. The materials are melted by a laser beam and deposited at points along a tool path to form an article of the desired shape and dimensions. Preferably the tool path and other parameters of the deposition process are established using computer-aided design and manufacturing techniques. A controller comprised of a digital computer directs movement of a deposition zone along the tool path and provides control signals to adjust apparatus functions, such as the speed at which a deposition head which delivers the laser beam and powder to the deposition zone moves along the tool path.

Most existing techniques, however, are based on open-loop processes requiring either considerable amount of periodic machining or final machining for close dimensional tolerances. Continuous corrective measures during the manufacturing process are necessary to fabricate net shape functional parts with close tolerances and acceptable residual stress. One exception is the system described in U.S. Pat. No. 6,122,564, filed Jun. 30, 1998. This application, the contents of which are incorporated herein by reference, describes a laser-aided, computer-controlled direct-metal deposition, or DMD, system wherein layers of material are applied to a substrate so as to fabricate an object or to provide a cladding layer.

In contrast to previous methodologies, the DMD system is equipped with feedback monitoring to control the dimensions and overall geometry of the fabricated article in accordance with a computer-aided design (CAD) description. The deposition tool path is generated by a computer-aided manufacturing (CAM) system for CNC machining, with post-processing software for deposition, instead of software for removal as in conventional CNC machining. Initial data using an optical feedback loop indicate that it totally eliminates intermediate machining and reduces final machining considerably. Surface finish in the order of 100 micron was observed. Even for closed-loop DMD technology, corrective measures are needed to address four major factors encountered during the process. They include dimension (height and width) control, the tailoring of composition, and the management of temperature and residual stress. Residual stresses, for example, may accumulate and lead to distortion and premature failure of the finished article during its use or operation. Although there are several techniques for post-mortem, i.e., after fabrication or after failure, these techniques are not timely and do not save the product. To alleviate the problem, periodic heat treatment is often needed. On the other hand, for cyclic loading applications, compressive residual stress improves the service life. Location and relative magnitude of stress are also important for the control of distortion. Residual stress also influences hardness.

Although progress is being made with respect to the management of unwanted properties in finished articles, additional work needs to be done in this regard. The combination of various management techniques would be particularly advantageous, especially in conjunction with closed-loop control. Continuous monitoring and control of height and width may be used to ensure close dimensional tolerance of the fabricated component, with distortion and cracking being simultaneously controlled through the monitoring and management of temperature and stress.

SUMMARY OF THE INVENTION

With respect to the layered fabrication of three-dimensional components, this invention builds upon the prior art by disclosing how multiple criteria may be monitored and controlled enhance the success of direct-metal deposition, including methods and apparatus for ameliorating problems which might otherwise impede large-scale production. More particularly, the invention reveals how to achieve greater control over factors such as deposit layer height/thickness, sub-harmonic vibration, contour path shape, powder mass flow, and deposition speed, and stress accumulation.

In the preferred embodiment, sensors are used to monitor some or all of the following parameters during the deposition process: deposit height, width, temperature, and residual stress. A predetermined limit with respect to the yield strength of the material is preferably set. If the stress exceeds that limit sensors will automatically introduce one or more remedial measures, the priority of which is established using a look-up table generated in accordance with prior experimental knowledge.

In one embodiment, for example, to control temperature induced distortion and stress, an infrared temperature detector may be used in conjunction with a controller to reduce temperature, increase speed and decreased power for purpose of stress management. To monitor crack initiation, acoustic emission, infrared temperature and eddy current methods are preferably employed, whereas to monitor the mixing at the interface for multiple material deposition, relative line emission spectroscopy will be employed, as disclosed in U.S. Pat. No. 6,122,564.

To enhance throughput, multiple nozzles are preferably employed to independently control speed and deposit dimension in a closed-loop arrangement so that complicated features may be constructed with close tolerances, so as to improve lead-time and design flexibility.

DETAILED DESCRIPTION OF THE INVENTION

Figure 1:
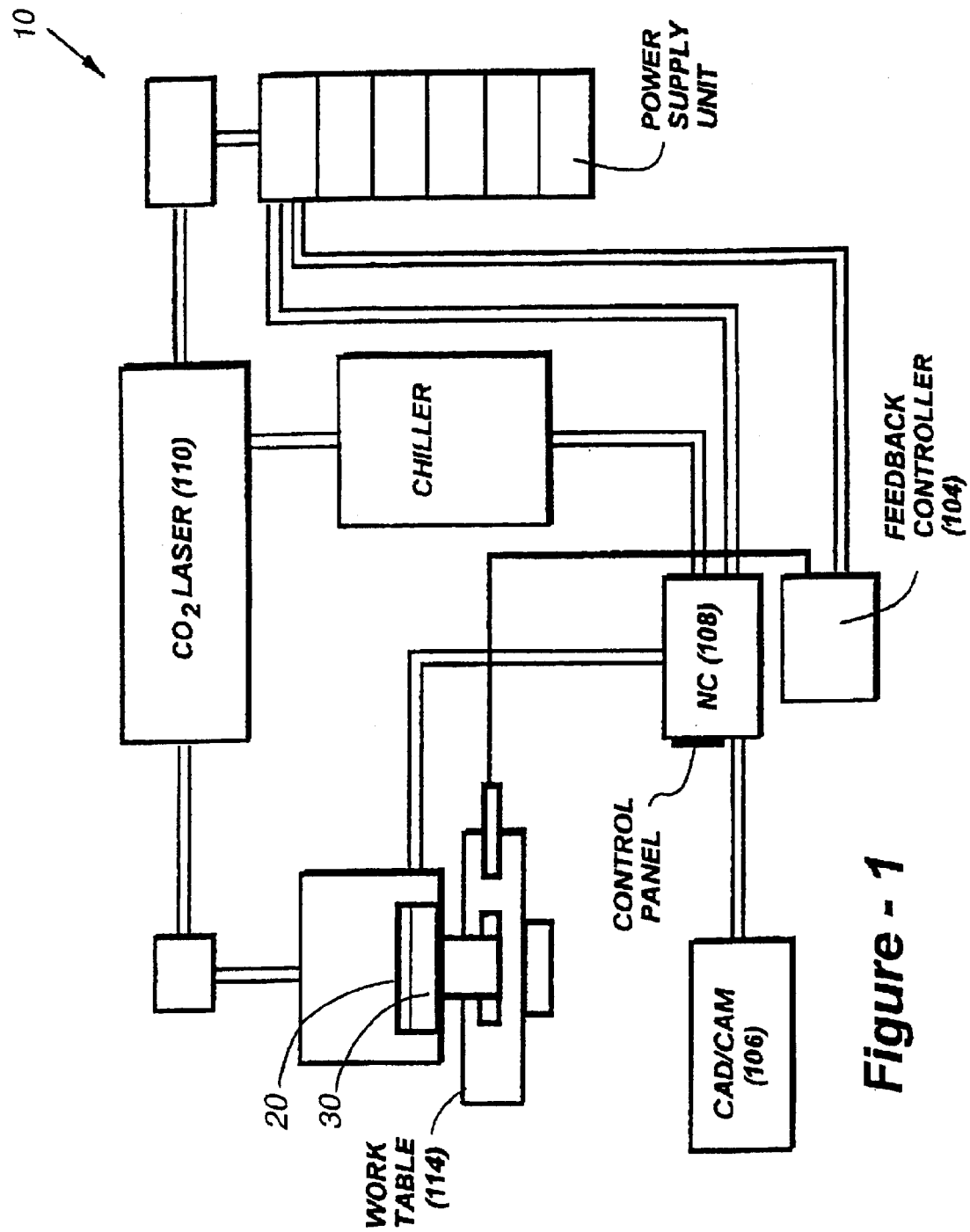
FIG. 1 is a schematic diagram of a laser-aided direct-metal deposition (DMD) system.

By way of a review, FIG. 1 illustrates a laser-aided, computer controlled direct material deposition (DMD) system in schematic form. The system 10 applies layers of material 20 on a substrate 30 to fabricate an object or cladding. As discussed above, the system is preferably equipped with feedback monitoring to control of the dimensions and overall geometry of the fabricated article. The geometry of the article is provided by a computer-aided design (CAD) system.

The deposition tool path is generated by a computer-aided manufacturing (CAM) system for CNC machining with post-processing software for deposition, instead of software for removal as in conventional CNC machining. CAM software interfaces with a feedback controller 104. These details of the laser-aided, computer controlled direct material deposition system can be found in U.S. Pat. No. 6,122,564, and are therefore not all explicitly shown in FIG. 1. The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 80 of the direct material deposition system typically cooperates directly with the numerical controller 90, which, itself, controls all functions of the direct material deposition system, including laser power.

The laser source 110 of the DMD system is mounted above the substrate 30 and a layer of material 20 is deposited according to the description of the object. The laser has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle co-axially with the beam.

A numerical controller 108 controls all operating components of the DMD system of FIG. 1, including the operating conditions of the laser, receiving direction from the CAD/CAM system 106 for building the part or product. The numerical controller 108 also receives feedback control signals from the feedback controller 104 to adjust laser power output, and further controls the relative position of the substrate and laser spray nozzle. The CAD/CAM system 106 is equipped with software which enables it to generate a path a cross the substrate for material deposition.

The laser is used to locally heat a spot on a substrate, forming a melt pool into which powder is fed to create a deposit having a physical dimension such as height. As described in U.S. Pat. No. 6,122,564, the extent of the physical dimension is controlled using an optical feedback loop. Optical detection means coupled to an optoelectric sensor are used to monitor the deposit, and a feedback controller is operative to adjust the laser in accordance with the electrical signal, thereby controlling the rate of material deposition. In the preferred embodiment, the physical dimension is the height of the deposit, and the system further includes an interface to a computer-aided design (CAD) system including a description of an article to be fabricated, enabling the feedback controller to compare the physical dimension of the deposit to the description and adjust the energy of the laser in accordance therewith.

In terms of specific apparatus, the optical detection means preferably includes an apertured mask through which light from the deposit passes to reach the optoelectric sensor, and the feedback controller includes circuitry for adjusting the laser in accordance with the presence or absence of the light from the deposit. This allows the system to optically monitor the physical dimension of the deposit, and control the physical dimension in accordance with the description of the article to be fabricated. The deposition head, preferably equipped with flying optics, is advanced to different localized region of the substrate until the fabrication of the article is completed.

To monitor the material deposit in three dimensions, the width of the deposit is preferably monitored using the video portion of the feedback loop. The width may be monitored by projecting the image onto a dedicated device, such as a linear array detector, and counting the illuminated pixels. Alternatively, if the camera is a CCD camera, the pixels may be counted in either dimension to measure height, width, or both, in which case the volume of the deposit may be ascertained.

Figure 2:
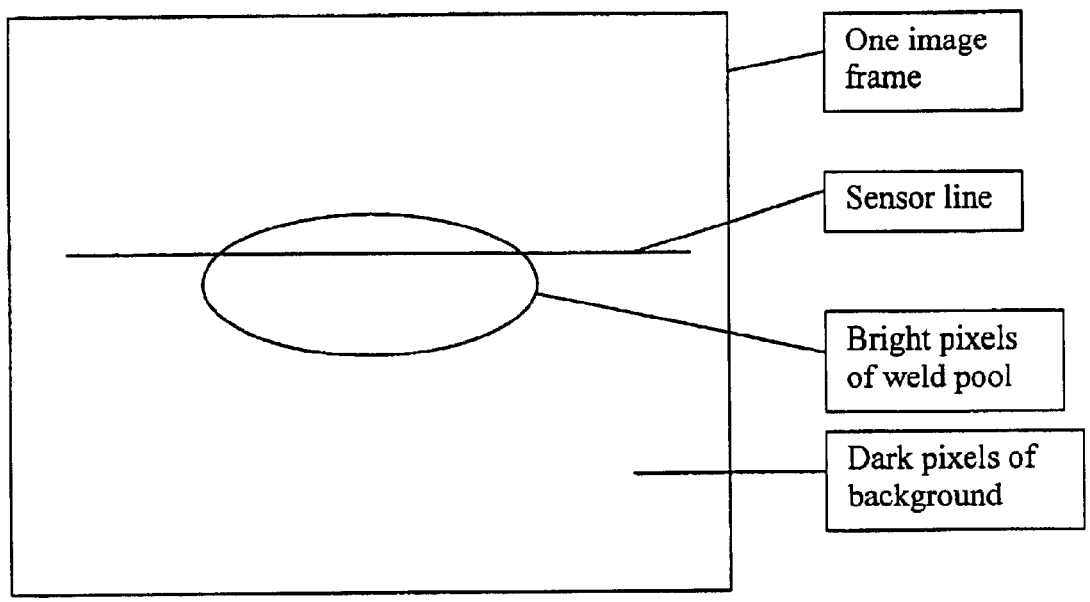
FIG. 2 illustrates how the width of a material deposit can be monitored by projecting the image on a detector and monitoring the illuminated pixels.

As powder is fed into the melt pool zone, the camera is positioned to receive a focused image of the weld pool, and the image information is streamed to a frame grabber card installed in a PC. Image analysis software, which provides user access to the frame data and analysis functions, is used to examine the pixels in a specific region of the image, called the "sensor line" as shown in FIG. 2. Based on analysis of the pixels in the sensor line, the frame grabber card generates the output signal, which controls the laser power.

During deposition, the pixels in the weld pool are very bright, while the pixels in the background are dark. The pixels along the sensor line exceeding a given intensity "i" (threshold pixels) are counted. If a monochrome camera is used, the brightness of any given pixel is represented by an integer value from 0 to 255, or an 8-bit binary number. With the camera properly set, the weld pool pixels are i>200, while the background pixels are i<50. If the number of threshold pixels exceeds a set number "N," then an output signal is generated to lower the laser power. The number N is chosen to be approximately half the pixel-width of the weld pool.

The image card receives images, or fields, from the CCD camera at a rate of 60 Hz This rate is based on the format of the particular camera used in the system; RS-170, for example, transmits at a frame rate of 30 fps (frame per second). The field is analyzed by counting the number of threshold pixels along the sensor line. If the number of threshold pixels exceeds the set number, N, then an output signal is generated to lower the laser power. The laser power signal used is a 33 Hz pulsed square wave (see U.S. Pat. No. 6,122,564). The board signal essentially replaces the photodetector used in the aforementioned patent.

Figure 3:
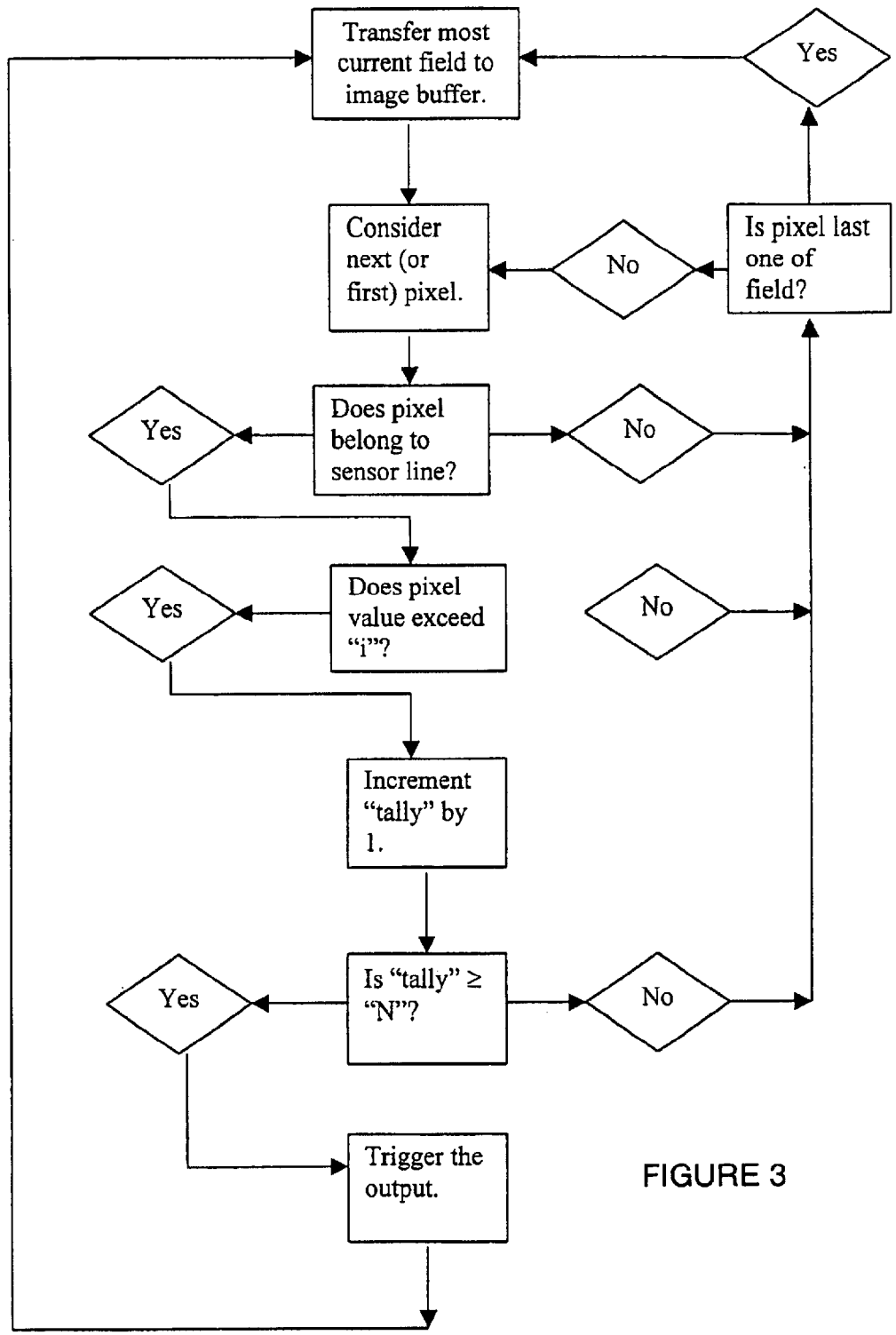
FIG. 3 is a flow diagram that illustrates important steps used to achieve height control according to the invention.

FIG. 3 is a flow diagram that illustrates important steps used to achieve height control according to the invention. Note that if the response time is too slow to get adequate height control, the response time may be reduced dramatically through the use of a high-speed CCD camera/frame grabber card combination, processing data using a faster computer such as a 500 MHz PC, and streamlining the software control of the frame grabber card.

For ferrous materials such as tool steels, the accumulation of residual stress during the manufacturing process may lead to failure and severe distortion. Periodic heat treatment is perhaps the most straightforward solution; however, on-line corrective measure similar to the optical feedback loop discussed above may be used to further improve productivity. In particular, preliminary research has shown that residual stress can be minimized through the use of a reheating pass using a laser preferably with slower speed and lower power to maintain temperature below the melting point of the deposit.

When the accumulated residual stresses exceed the yield strength of the material, cracking often occurs during the fabrication process. Thermal expansion and sometimes phase transformation are the main contributors to residual stress. Most steels, for example, change from austenite with face-centered cubic structure (FCC) to martensite with body-centered tetragonal crystal structure (BCT) above a certain critical cooling rate. The specific volume of BCT is 4% higher than that of FCC, and therefore martensitic transformation produces considerable stress.

Co-pending U.S. patent application Ser. No. 09/608,874 recognizes that the laser beam itself, or an additional beam, may be deployed as a localized heat treatment tool instead of a deposition tool. It was discovered that the use of laser energy during the process can minimize, if not eliminate, the periodic heat treatments now required for stress alleviation, thereby compressing the DMD fabrication cycle. In particular, the laser in the DMD process can be utilized for controlling residual stress by following a deposition cycle with a dry (i.e., without powder) run of one or more intensities to manipulate the stress magnitude and location. Alternatively, since it is well known that residual stress is a function of cooling rate, a plurality of laser beams may be used to control the cooling rate of the deposited layer.

Not only is laser heat treatment a proven process, incorporation of the technique into the DMD process architecture may improve the efficiency of DMD for many materials. The temperature cycling needed for phase change may follow the similar time-temperature trend for conventional materials, but using shorter time period since diffusive reactions will use shorter paths due to the fine grain structure associated with laser. The following alternative techniques may be used, with or without laser heat treatment, to reduce residual stress:

In-situ resistive heating periodic resistive heating may be administered for post-DMD fabrication. This may be carried out without removing the component from the deposition stage through the use of a wrap-around heating element. Multiple parts may be placed on a carousel under the laser beam. Heat treatment can be carried out on a component after deposition of pre-determined number of layers, while another part is being deposited at the same time. The carousel will periodically exchange parts for deposition and heat treatment, but no re-indexing will be necessary since the part is kept on its original fixture. With in-situ inductive heating, a shaped electrode may be used to heat treat deposited layers to minimize residual stress accumulation. The frequency of the induction heater can be varied to control the depth of the heat treatment.

Sub-Harmonic Vibration

Sub-harmonic vibration during the process can also be used to affect the residual stress. Frequency of the vibration determines the magnitude of the stress accumulation. Commercial equipment from Bonal technology sold under the name of Metalax was used for initial experiments. FIGS. 4A through 7B show some of the data gathered for the DMD process with simultaneous sub-harmonic vibration. In a closed-loop DMD process, sub-harmonic vibration may also be deployed to take corrective measures during material deposition.

Contouring Pass Adjustment

Figure 4A:
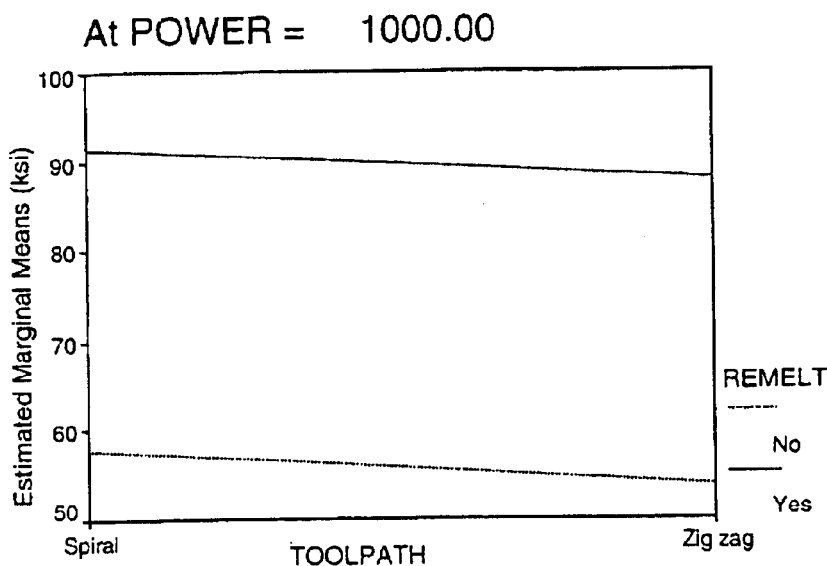
FIG. 4A is a profile plot of tool path versus remelt at a laser power level of 1000 Watts.
Figure 4B:
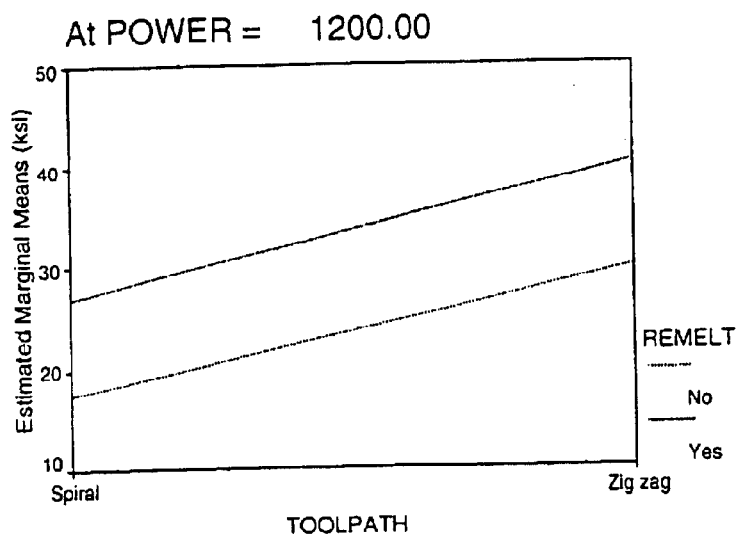
FIG. 4B is a profile plot of tool path versus remelt at a laser power level of 1200 Watts.

Contouring pass also affect the stress accumulation. FIGS. 4A and 4B show the effects of factors power, remelt and tool path from which residual stress build-up may be assessed. It should be apparent from these figures that remelting is responsible higher stress accumulation in the sample. Higher power is helpful in reducing the residual stresses, which is evident from these charts. But the effect of tool path seems depend on the level of power.

In FIG. 4A, at power 1000 W, a zigzag tool path mode produces slightly better results in terms of minimization of stresses whereas, at power level 1200 W (FIG. 4B), a spiral setup performed better. Thus, power and tool path is interact with one another. When interaction is evident, no definitive conclusion may be made on the individual effect of the factors. However, based on experimental data, a look-up table can be incorporated as part of the DMD process control computer to adjust the tool path to suit the need.

Increased Powder Mass Flow

Figure 5A:
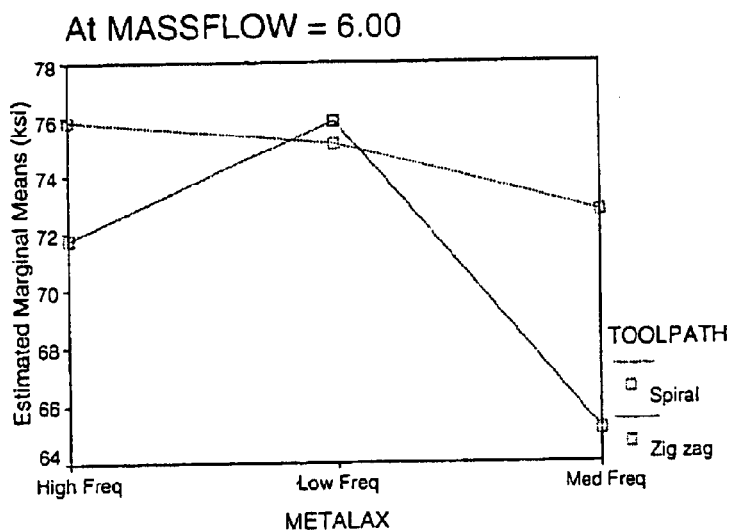
FIG. 5A is a profile plot of tool path versus Metalax at a mass flow of 6 gm/min.
Figure 5B:
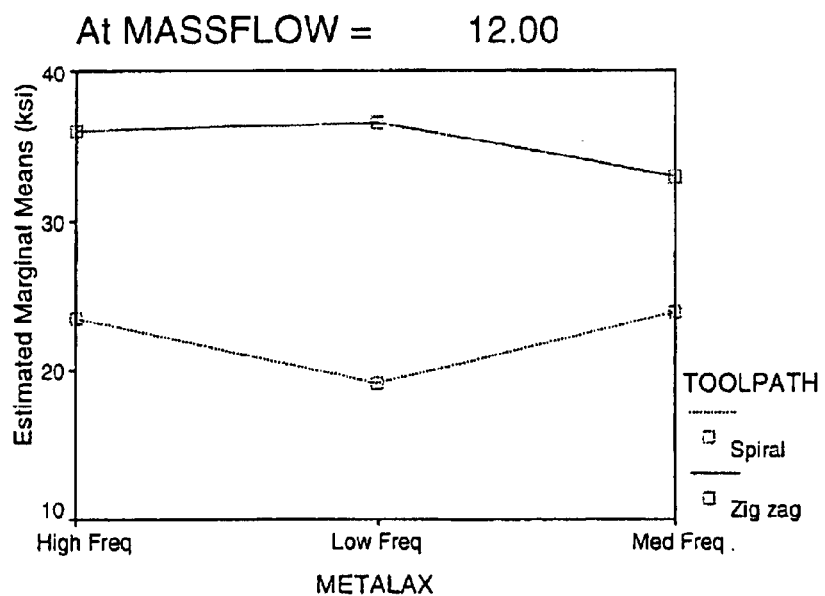
FIG. 5B is a profile plot of tool path versus Metalax at a mass flow of 12 gm/min.

FIGS. 5A and 5B indicate that massflow rate has a significant effect on the accumulation of residual stresses in a DMD H13 steel specimen. It should be apparent from these two profile plots that a higher massflow rate indeed produced a specimen with much lower residual stresses in comparison with low mass flow rate.

Increased Deposit Layer Thickness

Figure 6A:
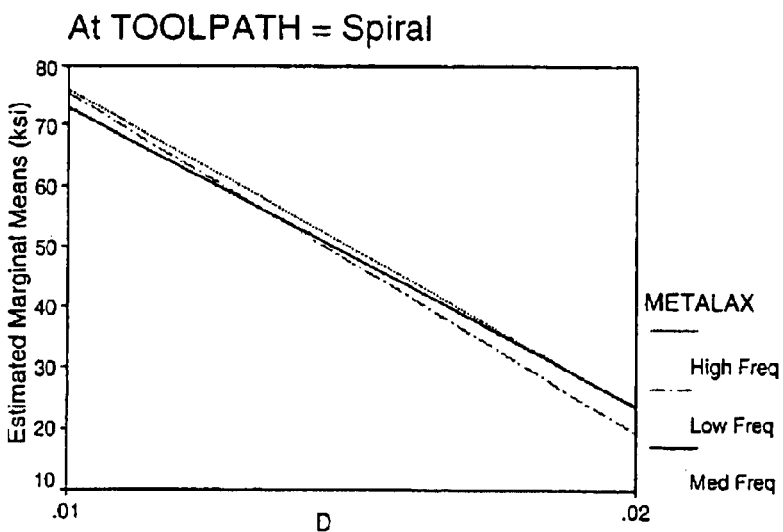
FIG. 6A is a profile plot of layer thickness versus Metalax using a spiral tool path.
Figure 6B:
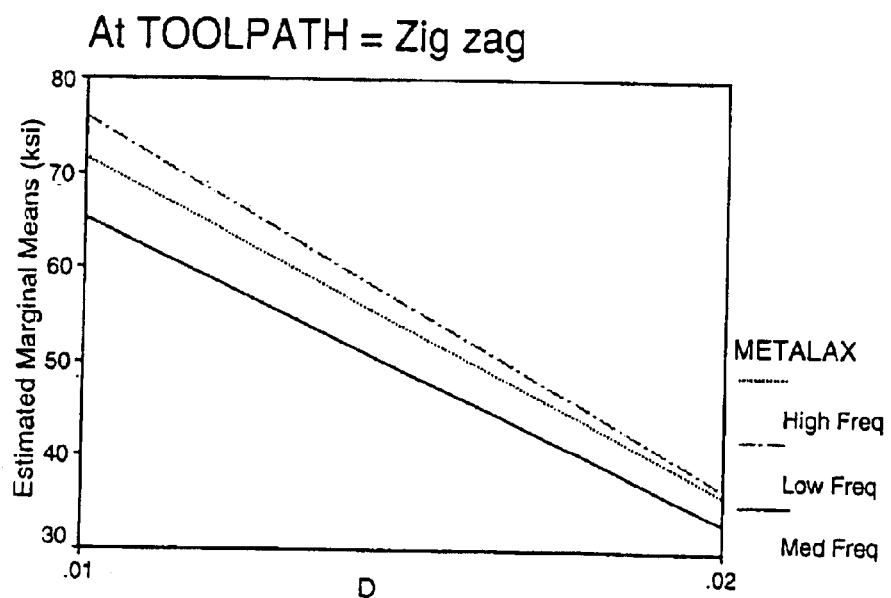
FIG. 6B is a profile plot of layer thickness versus Metalax using a zigzag tool path.

FIGS. 6A and 6B indicate that layer thickness has major effect on the stress. In particular, a higher level of layer thickness has produced samples with lower residual stresses. The combination of higher level of layer thickness with low freq setup of Metalax and Spiral mode of Tool Path setup produced the minimum amount of stress in the specimen.

Slower Speed

Figure 7A:
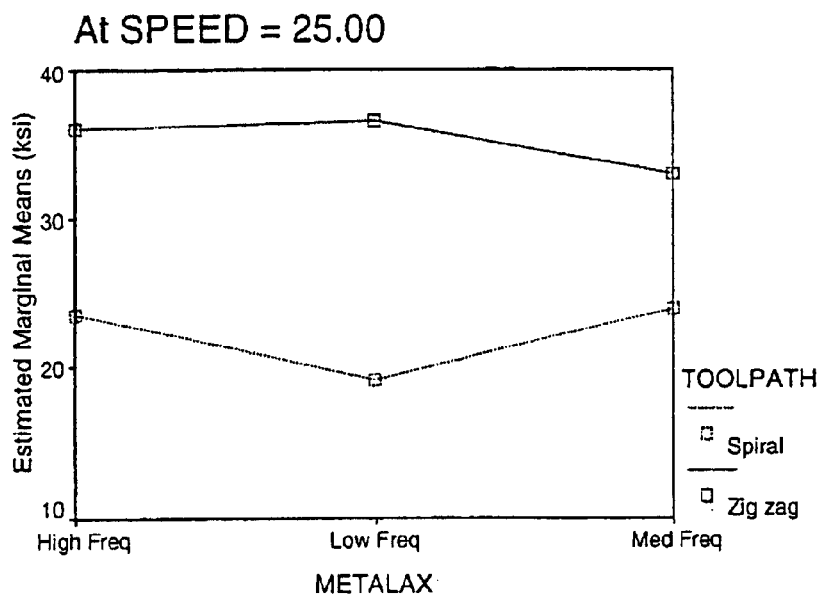
FIG. 7A is a profile plot of tool path versus Metalax at a speed of 25 ipm.
Figure 7B:
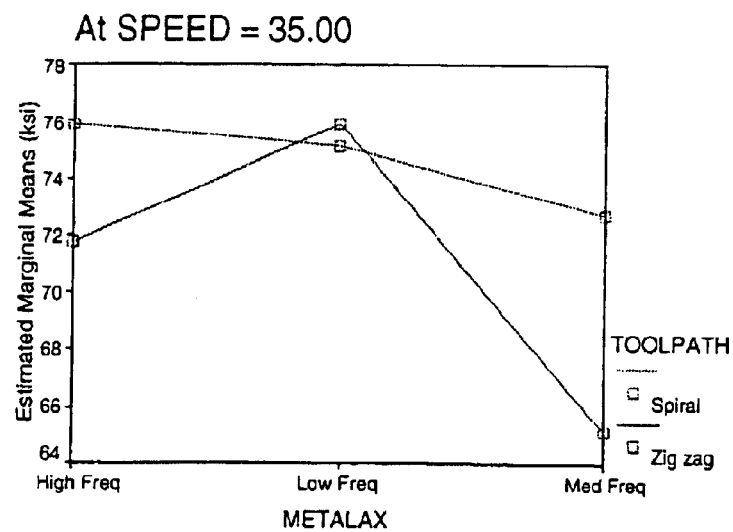
FIG. 7B is a profile plot of tool path versus Metalax at a speed of 35 ipm.

A close look at FIGS. 7A and 7B reveals that travel speed also has a profound effect on the residual stress. It is evident from these charts that travel speed at 25 ipm has produced samples with much less residual stress compared to speed setup at 35 ipm. When the effect is quantified, it is seen that stress is around 35 ksi for speed of 25 ipm while it is 75 ksi for travel speed of 35 ksi. The effects of Metalax and tool path appear to exhibit contradictory results. That is, a low frequency Metalax setup combined with low speed and spiral tool path produced better result whereas, at high speed level, the result was opposite.

Based upon the above experiments, sensors are preferably used according to the invention to continually monitor deposit height, width, temperature and residual stress during the deposition process. A predetermined limit with respect to the yield strength of the material will be set, such that if the stress exceeds that limit sensors will automatically introduce one of the above mentioned remedial measures. Priority of the remedial measures will be set up from a look up table created from prior experimental knowledge.

For example, to control temperature induced distortion and stress, an infrared temperature detector will be used and temperature can be reduced using increased speed and decreased power.

To monitor the material deposit in three dimensions, height will be monitored using the optical feedback loop described in U.S. Pat. No. 6,122,564, with width being monitored using the video portion of the feedback loop.

To monitor crack initiation, acoustic emission, infrared temperature and eddy current methods are preferably employ ed. To monitor the mixing at the interface for multiple material deposition, relative line emission spectroscopy is preferably employed, as disclosed in U.S. Pat. No. 6,122,564.

Figure 8:
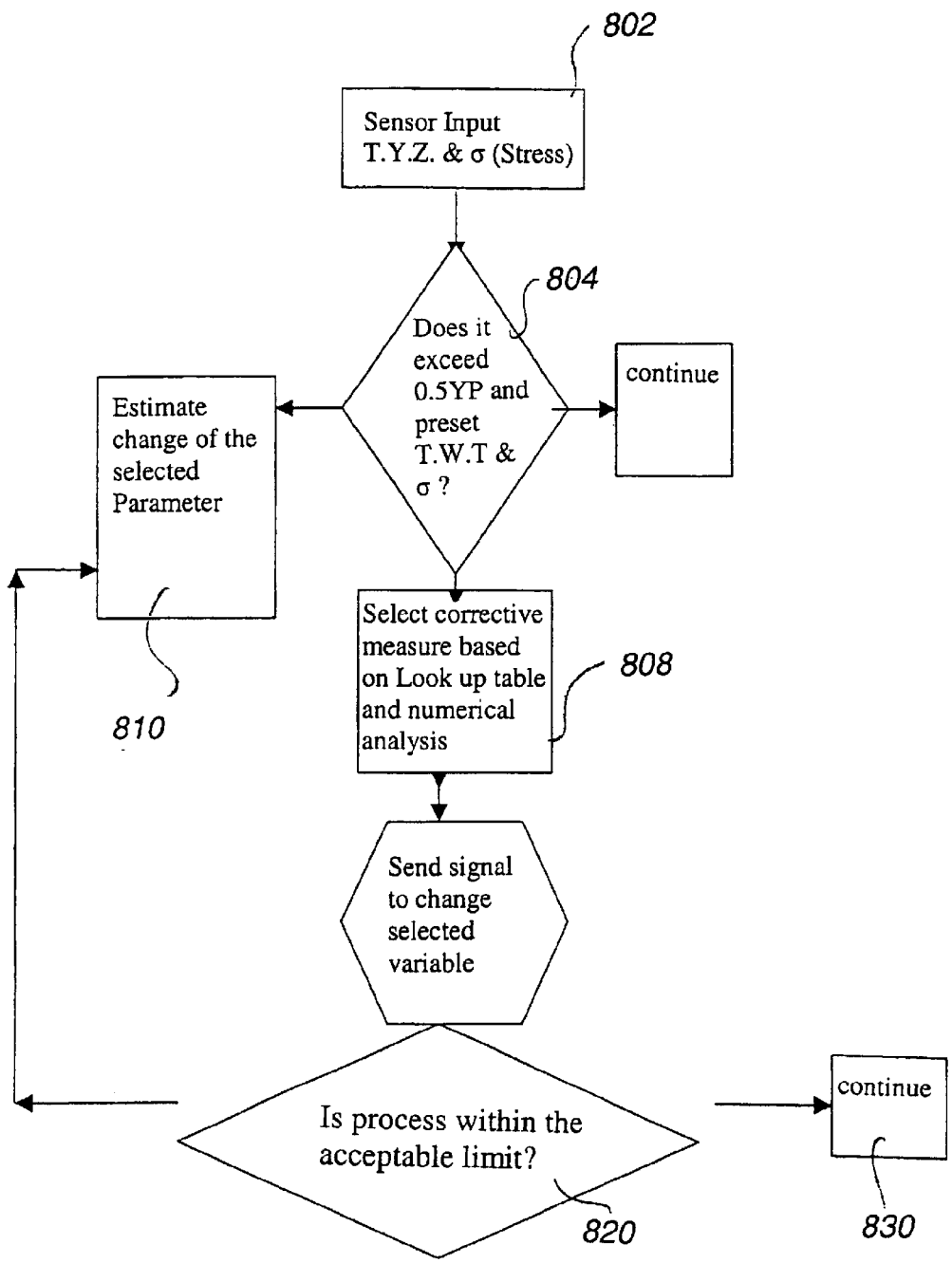
FIG. 8 is a flow chart which shows a preferred decision-making process employed according to the invention.

FIG. 8 is a flowchart which shows how multiple criteria may be monitored and adjusted according to the invention to optimize a direct metal deposition process. At block 802, sensor inputs are received, and at block 804, the question is asked whether the size of the deposit and residual stress are within acceptable limits. If the dimension of the object and measurable criteria are within tolerance, the process continues at 806. If the stress level is unacceptable, a corrective measure is chosen at 808. If size is the issue, an estimate of the parameter to be hanged is undertaken at 810. In either case, the question is asked again at 820, and if the dimension of the object and measurable criteria are within tolerance, the process continues at 830.

In maintaining close tolerances, the deposition rate is somewhat limited to deposit thickness per pass. Although the present deposition rate for closed-loop DMD is commercially viable, an increase in the deposition rate and the simultaneous deposition of multiple material will significantly reduce the lead time and increase the design flexibility. Considering the importance of lead time reduction and design flexibility to produce multiple material at different position of the component for improved performance such as thermal and wear management, multiple laser heads, nozzles and powder delivery systems may be used to increase deposition rate at the same time maintain the dimensional tolerance.

Each nozzle and powder delivery system will also have a set of sensors for feedback control of height, temperature and stress accumulation. Also, angle of incidence of the nozzle with respect to the substrate can be varied using robotic wrist like mount. Based on the sensor data speed, angle of incidence and beam power will be modified to ensure deposit layer with specified dimension. The design data will provide the material information. For example, one nozzle can deposit tool steel in one area of the component whereas the other nozzle can deposit copper in other area of the component. In accordance with this method, a complex object can be built at faster rate with multiple materials.

In terms of apparatus, product design CAD data are fed to the computer preferably equipped with a parallel processing capability. CAM software is used to divide the component in multiple sectors and assign the task for each sector to each nozzle an powder delivery system. The task command can either be sent directly to the laser-CNC system, or it may be sent via a local- or wide-area computer network for remote manufacturing. The on-line process sensor data is preferably continuously monitored, and appropriate control functions will be taken to produce near net shape components with the desired property and dimension.

We claim:

1. A method of optimizing a laser-assisted direct metal deposition process wherein material added to a melt pool is solidified fabricated an object according to a description thereof, the comprising the steps of:
   creating a database including acceptable direct metal deposition process parameters based upon previously obtained empirical data;
   measuring one or more dimensions of the melt pool;
   monitoring the accumulation of residual stress of the object; and
   referring to the description of the object to determine if the object is being fabricated in accordance with the description and, if so;
   referring to the database to determine if the process parameters are within acceptable limits and if not;
   implementing a corrective measure.

2. The method of claim 1, wherein the process parameter is the accumulation of stress within the object.

3. The method of claim 2, wherein the corrective measure is to modify the contour path of the laser.

4. The method of claim 2, wherein the corrective measure is to modify the mass flow of the powder.

5. The method of claim 2, wherein the corrective measure is to modify the speed of the deposition.

6. The method of claim 1, wherein the residual stress of the object is monitored through sub-harmonic vibration.

7. The method of claim 1, wherein the process parameter is the temperature of the melt pool.

8. The method of claim 7, wherein the corrective measure is to modify the power delivered to the laser.

9. The method of claim 1, wherein one or more dimensions of the melt pool are measured by monitoring the light received at the pixels of an optical detector.

10. The method of claim 1, wherein the database includes a look-up table.

11. A system for optimizing a laser-assisted direct metal deposition process wherein an object is fabricated in accordance with a description thereof, the system comprising:
- a controllably moveable deposition head including a laser operative to form a melt pool on the surface of the object and a supply of powder feeding the melt pool to be solidified as the deposition head is traversed;
- a database including acceptable direct metal deposition process parameters based upon previously obtained empirical data;
- a first sensor for detecting one or more dimensions of the melt pool;
- a second sensor the sensing the accumulation of residual stress of the object; and
- a controller interfaced to the laser, deposition head movement control, database and first and second sensors, the controller being operative to perform the following functions:
- refer to the description of the object to determine if the object is being fabricated in accordance with the description and, if so;
- refer to the database to determine if the process parameters are within acceptable limits and if not;
- implement a corrective measure.

12. The system of claim 11, wherein the process parameter is the accumulation of stress within the object.

13. The system of claim 12, wherein the corrective measure is to modify the contour path of the laser.

14. The system of claim 12, wherein the corrective measure is to modify the mass flow of the powder.

15. The system of claim 12, wherein the corrective measure is to modify the speed of the deposition.

16. The system of claim 12, wherein the first sensor is a sub-harmonic vibration sensor.

17. The system of claim 11, wherein temperature sensor.

18. The system of claim 17, wherein the corrective measure is to modify the power delivered to the laser.

19. The system of claim 11, wherein the second sensor is a one- or two-dimensional pixelized image sensor.

20. The system of claim 11, further including multiple deposition heads.

* * * * *